United States Patent
Yahagi

(10) Patent No.: US 6,370,378 B1
(45) Date of Patent: Apr. 9, 2002

(54) CELLULAR COMMUNICATING NETWORK AND METHOD FOR LOCATING MOBILE STATIONS USING HIERARCHICALLY ARRANGED DATABASES

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/340,023

(22) Filed: Jun. 28, 1999

(30) Foreign Application Priority Data

Jun. 29, 1998 (JP) .......................................... 10-196500

(51) Int. Cl.[7] ................................................. H04Q 7/20
(52) U.S. Cl. ...................... 455/433; 455/432; 455/435; 455/458; 455/500; 370/337
(58) Field of Search ................................. 455/433, 432, 455/435, 458, 500; 370/337

(56) References Cited

U.S. PATENT DOCUMENTS

| | | | |
|---|---|---|---|
| 5,590,133 A | 12/1996 | Billström et al. ........... | 370/349 |
| 5,875,400 A | * 2/1999 | Madhavapeddy et al. ... | 455/458 |
| 5,889,770 A | * 3/1999 | Jokiaho et al. ............. | 370/337 |

FOREIGN PATENT DOCUMENTS

| | | |
|---|---|---|
| EP | 0 710 043 A1 | 5/1996 |
| JP | H2-26143 | 1/1990 |
| WO | WO 95/01066 | 1/1995 |

* cited by examiner

*Primary Examiner*—Lee Nguyen
*Assistant Examiner*—Danh C Le
(74) *Attorney, Agent, or Firm*—Sughrue Mion, PLLC

(57) ABSTRACT

In a cellular mobile communication network, mobile records are maintained in a first database for indicating a base station area when a mobile station crosses a boundary between adjacent location areas and enters that base station area. A second database is associated with each control group of base station areas for maintaining mobile records for indicating a base station area when the mobile station successively crosses a boundary between adjacent base station areas. In response to a call request, one of the mobile records of the first database is accessed to identify a control group of base station areas and a search request is produced. In response to the search request, one of the mobile records of the second database is accessed and a paging signal is broadcast to at least one base station area indicated in the accessed mobile record to wait for a response from the mobile station. If no response is not returned, the paging signal is broadcast to remaining base station areas of the identified control group.

20 Claims, 5 Drawing Sheets

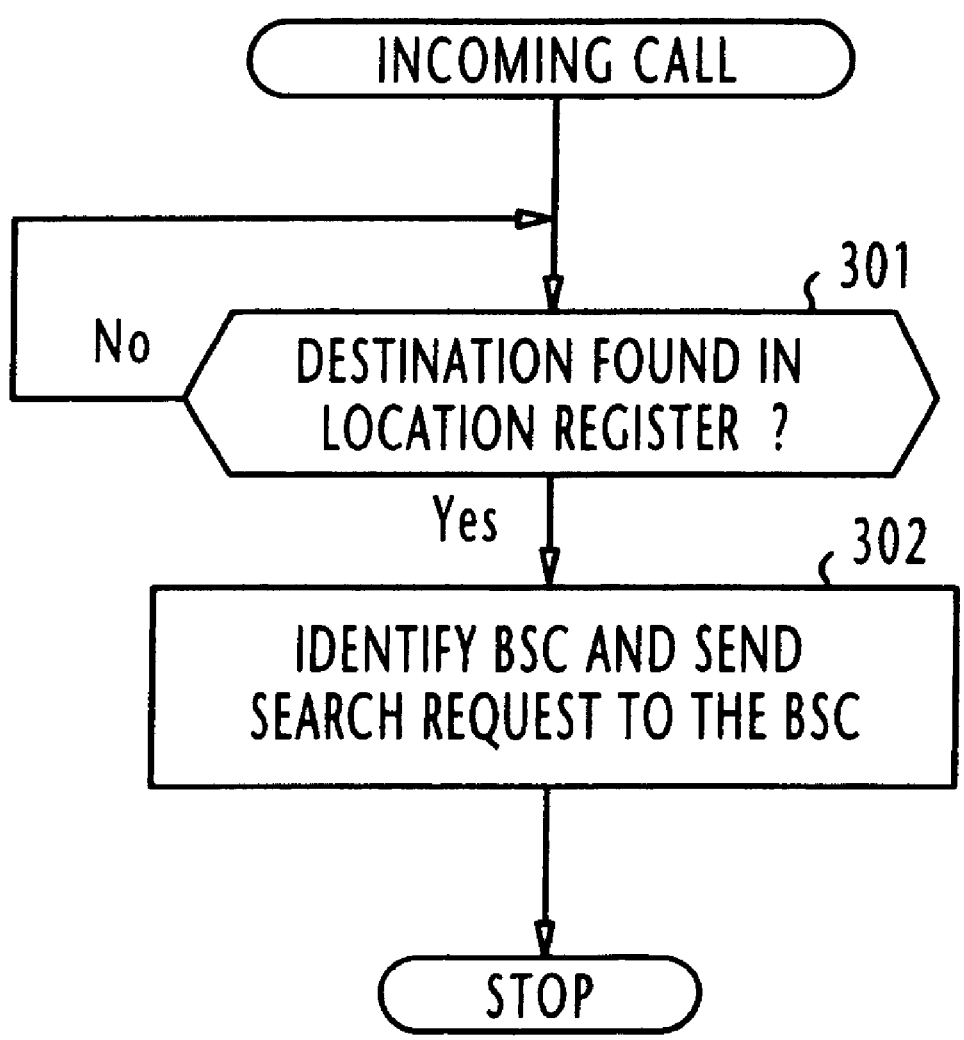

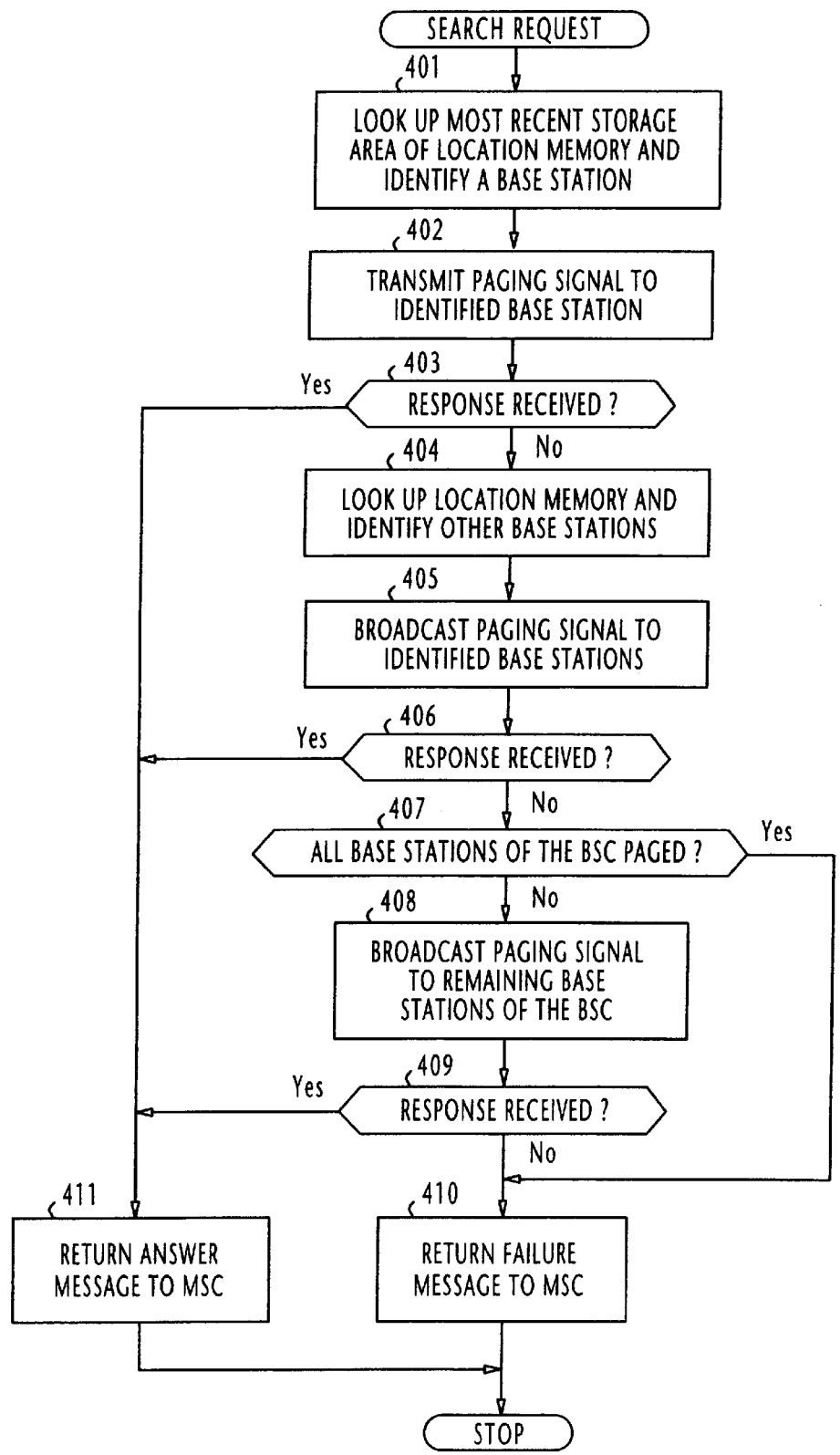

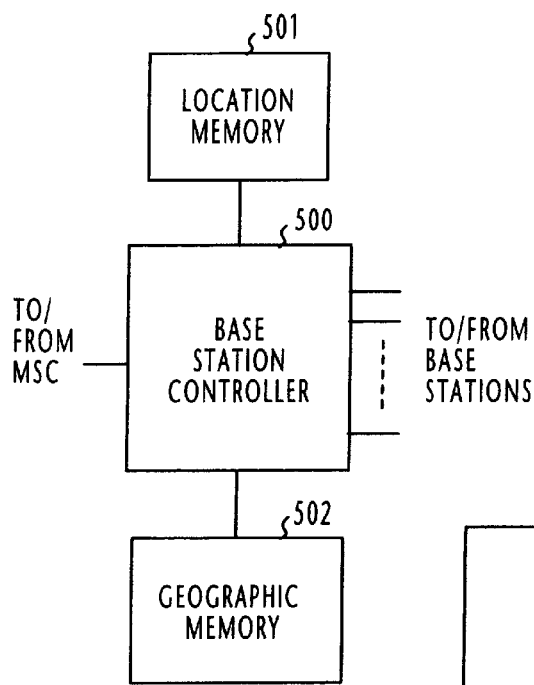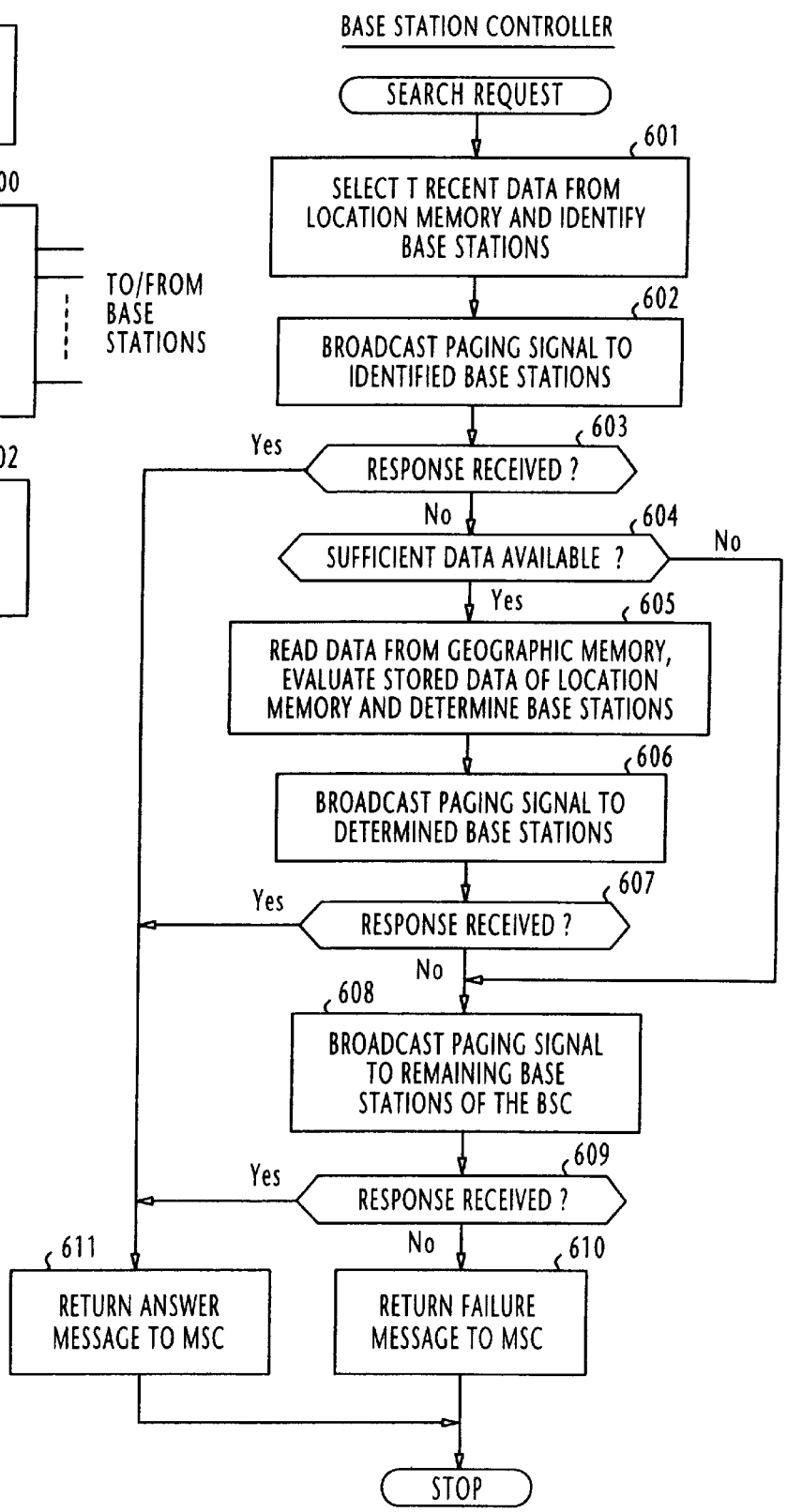

CELLULAR COMMUNICATING NETWORK AND METHOD FOR LOCATING MOBILE STATIONS USING HIERARCHICALLY ARRANGED DATABASES

BACKGROUND OF THE INVENTION

1. Field of the Invention

The present invention relates generally to cellular mobile communications systems where a location register is provided to maintain mobile records, and more specifically to an efficient method of locating a mobile station from the mobile switching center when there is a need to access the mobile station.

2. Description of the Related Art

In a cellular mobile communication network, base station areas are assembled into a plurality of location areas and in each location area the base stations are further assembled into a number of control groups. Base stations of each control group are connected to a base station controller. The current mobile locating process of a cellular mobile communication network involves the use of a database called a location register which is usually provided in a mobile switching center to which a number of base station controllers are connected. Mobile stations are constantly receiving base station identification codes and location area identification codes from surrounding base stations. When a mobile station crosses a boundary between adjacent location areas, it sends a location update request containing its mobile identification code and the codes received from a nearby base station.

This request is relayed through the nearby base station and through a corresponding base station controller to the mobile switching center, where the location register is updated according to the request from the mobile station. If there is an incoming call destined for the mobile station, the mobile switching center looks up the location register and identifies its location area and all base station of the location area. The mobile switching center proceeds to broadcast a paging signal to the identified base stations. As a result, copies of the paging signal are broadcast simultaneously from such base stations in search of the called mobile station. If the mobile station is located in one of the base station areas, it sends a response message, which is relayed through the base station and the base station controller to the mobile switching center.

However, since the paging signal is broadcast from all base stations of a location area, even a single page significantly increases the amount of network's downlink traffic.

SUMMARY OF THE INVENTION

It is therefore an object of the present invention to provide a cellular mobile communication network and method of communication for efficiently locating a mobile station.

According to a first aspect of the present invention, there is provided a cellular mobile communication network including a plurality of base stations for respectively covering base station areas, the base station areas being assembled into a plurality of location areas and the base station areas of each location area being assembled into a plurality of control groups. The network comprises a first database for maintaining a plurality of mobile records, each of the mobile records indicating one of the base station areas when a mobile station crosses a boundary between adjacent location areas and enters the base station area. A second database is provided which is associated with one of the control groups of base station areas for maintaining a plurality of mobile records, one of the mobile records indicating a base station area when the mobile station successively crosses a boundary between adjacent base station areas of one of the location areas. A first controller is responsive to a call request for accessing one of the mobile records in the first database to identify one of the control groups of base station areas and producing a search request. A second controller is associated with one of the control groups of base station areas, the second controller being responsive to the search request for accessing one of the mobile records of the second database and transmitting a paging signal to at least one base station area indicated in the accessed mobile record to wait for a response from the mobile station and broadcasting the paging signal to remaining base station areas of the identified control group if the response is not returned from the mobile station.

Preferably, the mobile station is arranged to transmit a message indicating that the mobile station is crossing the boundary between adjacent location areas, and the first controller responds to the message for creating the mobile record in the first database and returning an acknowledgment message to the mobile station. The mobile station is further arranged to transmit a message indicating that the mobile station is crossing the boundary between adjacent base station areas, and the second controller responds to the message for creating the mobile record in the second database and returning no acknowledgment message to the mobile station.

According to a second aspect, the present invention provides a communication method for a cellular mobile communication network including a plurality of base stations for respectively covering base station areas, the base station areas being assembled into a plurality of location areas and the base station areas of each location area being assembled into a plurality of control groups. The method comprises the steps of (a) maintaining a plurality of mobile records in a first database, each of the mobile records indicating one of the base station areas when a mobile station crosses a boundary between adjacent location areas and enters the one base station area, (b) maintaining a plurality of mobile records in a second database associated with one of the control groups of base station areas, one of the mobile records indicating a base station area when the mobile station successively crosses a boundary between adjacent base station areas of one of the location areas, (c) accessing one of the mobile records in the first database in response to a call request and identifying one of the control groups of base station areas and producing a search request, (d) accessing one of the mobile records of the second database in response to the search request, (e) transmitting a paging signal to at least one base station area indicated in the accessed mobile record to wait for a response from the mobile station, and (f) broadcasting the paging signal to remaining base station areas of the identified control group if the response is not returned from the mobile station.

BRIEF DESCRIPTION OF THE DRAWINGS

The present invention will be described in further detail with reference to the accompanying drawings, in which:

FIG. 3 is a flowchart of the operation of a mobile switching center when a search request is sent to a base station according to the present invention;

FIG. 4 is a flowchart of the operation of a base station when locating a mobile station in response to a search request from the mobile switching center according to one embodiment of the present invention;

FIG. 5 is a block diagram of a base station controller according to a modified embodiment of the present invention; and FIG. 6 is a flowchart of the operation of the base station when locating a mobile station in response to the search request according to the modified embodiment of the invention.

DETAILED DESCRIPTION

Figure 1:
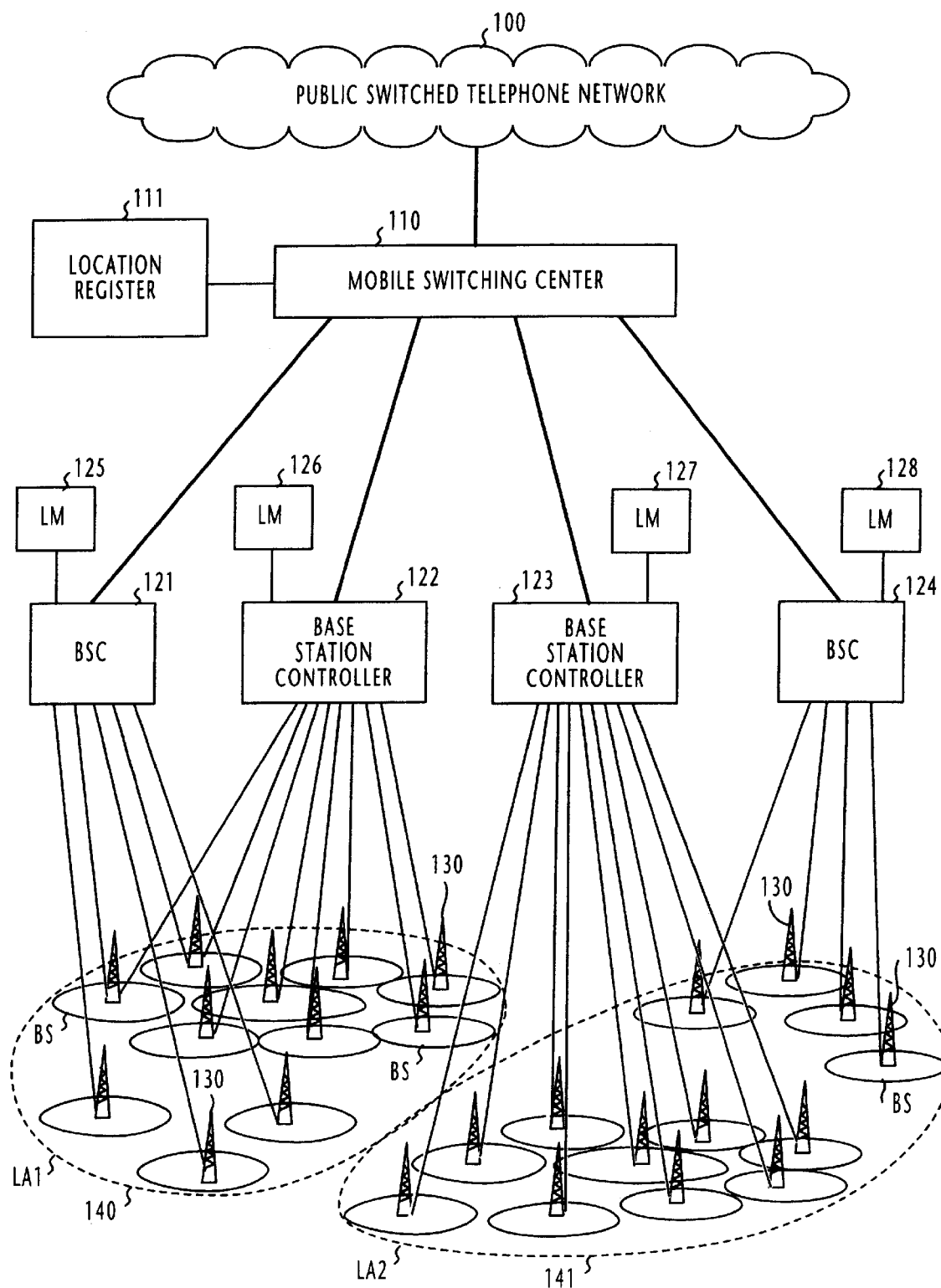
FIG. 1 is a block diagram of an exemplary cellular mobile communication network in which a hierarchically layered location memory structure of the present invention is illustrated.

Referring now to FIG. 1, there is shown an exemplary cellular mobile communication network in which hierarchically layered memories of the present invention are illustrated.

A mobile switching center 110 is connected to a public switched telephone network 100 to accommodate a plurality of base station controllers 121 through 124 for serving cell-site base stations 130 covering respective cell-site areas BA's. A plurality of location areas are defined in the network. Some of the base stations may be connected to more than one base station controller. Each location area is formed by a group of base stations which are simultaneously paged by broadcast paging signals from the mobile switching center 110 when there is an incoming call from the switched network 100. In the illustrated example, the base stations served by base station controllers 121 and 122 are grouped to form a location area LA1 and those served by base station controllers 123 and 124 are grouped to form a location area LA2.

Mobile switching center 110 has a database, called location register 111 to maintain data indicating the identities (MS) of mobile stations and the identities (BS) of their current base stations. Database 111 is updated when a mobile station travels across a boundary between adjacent location areas and announces its new location.

According to the present invention, the base station controllers 121 through 124 are respectively provided with databases, or location memories 125 through 128 to maintain data indicating the identities of mobile stations and the identities of their current base stations. Each of these databases is updated when a mobile station enters or leaves the coverage area (BA) of a base station.

Each base station is constantly transmitting its base station (BS) identification code and its LA identification code to allow mobile stations to identify their current location and announce their new location when they travel across a boundary between adjacent cell-site areas. When a mobile station receives BS and LA identification codes from a nearby base station, it returns its mobile (MS) identification code and the received BS and LA identification codes to the nearby base station.

Figure 2:
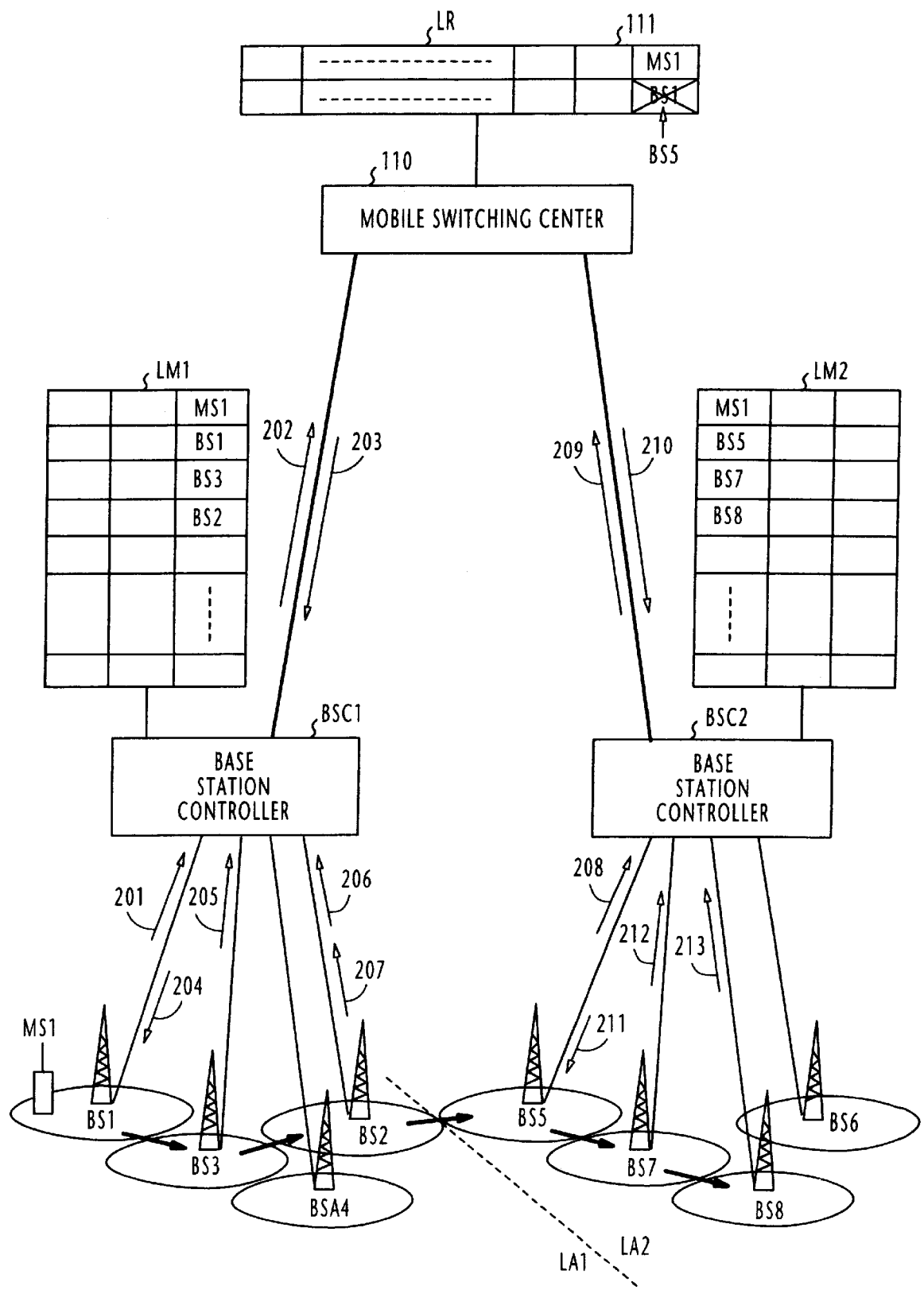
FIG. 2 is a block diagram of the cellular communication network for illustrating the contents of the layered memories when a mobile station moves around, hopping from one cell-site area to another.

In FIG. 2, assume that a mobile station MS1 is travelling across the boundaries of base stations BS1 through BS4 of location area LA1 and the boundaries of base stations BS5 through BS8 of location area LA2. When the mobile station MS1 is in the coverage area of base station BS1, it is receiving a set of identification codes BS1 and LA1 from the nearby base station BS1 and returns a message containing its identity MS1 and the received codes BS1 and LA1 to the base station BS1. Base station BS1 receives this message and transmits a copy 201 of the received message to the base station controller BCS1.

In response to the message 201, the base station controller BSC1 assigns an entry of the location memory LM1 to the mobile station MS1 and stores the identification code BS1 in the assigned entry. At the same time, the base station controller BSC1 sends a location update message 202 to the mobile switching center 110 for mapping the mobile's identity MS1 to the base station identity BS1 in the location register 111.

In order to ensure that the contents of the location register 111 correctly match the actual mobile locations, the mobile switching center 11 0 returns an acknowledgment message 203 to the base station controller BSC1, which is retransmitted to the base station BS1 as a message 204 and relayed to the mobile station MS1. After transmitting a return message, the mobile station MS1 waits a specified time interval for the acknowledgment message. If the signal from the mobile station MS1 fails to reach the base station BS1, the mobile station MS1 receives no acknowledgment message and retransmits a copy of the message again when the specified time interval expires.

In order to reduce the network's volume of traffic associated with the transmission of location identification codes, the base station controllers do not return their own acknowledgment message when their location memory is updated.

Therefore, when the mobile station MS1 moves out of the coverage area of base station BS1 enters the coverage area of base station BS3, it sends a location update message containing the area identities BS3 and LA1 as well as its identity MS1 to the base station BS3. A copy 205 of this update message is sent from the base station BS3 to the base station controller BSC1 to store the cell-site identity BS3 into a storage area of the entry of the location memory LM1 assigned to the mobile station MS1 that is next to the storage area of BS1. No acknowledgment message is returned from the base station controller to the mobile station in response to the update message 205. Likewise, when the mobile station MS1 moves to the coverage area of base station BS2, an update message 206 is sent from the base station BS2 to the base station controller BSC1. The location memory LM1 is thus updated by storing the cell-site identity BS2 into a storage area of the mobile's entry next to the storage area of BS3.

When the mobile station is crossing a boundary between the location areas LA1 and LA2 and entering the coverage area of base station BS5, leaving the coverage area of base station BS2, the location update message from the mobile station MS1 is received by both base stations BS2 and BS5, causing a location update message 207 to be transmitted from base station BS2 to the base station controller BSC1 and a location update message 208 to be transmitted from base station BS5 to the base station controller BSC2. As a result, the base station controller BSC1 erases the contents of the entry of the location memory LM1 that is assigned to the mobile station MS1. On the other hand, the base station controller BSC2 responds to the message 208 by assigning an entry of the location memory LM2 to the mobile station MS1 and storing the cell-site identity BS5 into the assigned entry, and reports the location update of MS1 to the mobile switching center 110 with a message 209. Mobile switching center 110 knows that the mobile station MS1 has entered the location area LA2 and updates its register 111 by overwriting the old cell-site identity BS1 with the new cell-site identity BS5, and then returns an acknowledgment message 210 which is relayed through the base station controller BSC2 as a message 211 to the base station BS5 and sent to the mobile station MS1.

If the mobile station MS1 continues to travel and enters the coverage area of base station BS7 and then to the area of base station BS8, location update messages 212 and 213 will be successively transmitted from these base stations to the base station controller BSC2 so that the cell-site identities of these base stations are stored in successive storage areas of the location memory LM2, as illustrated.

If there is an incoming call from the switched network that is destined for a mobile station, the mobile switching center 110 attempts to locate the called mobile station. Instead of broadcasting a paging signal to all base stations of a location area, the mobile switching center 110 of the present invention identifies one or more base station controllers in which the mobile's identification code is stored and proceeds to send a search request to such base station controllers.

The operation of the mobile switching center and a base station controller according to a first embodiment of the present invention is illustrated in the flowcharts of FIGS. 3 and 4.

In FIG. 3, when the mobile switching center 110 receives an incoming call from the PSTN 100, it makes a search through the location register 111 for a mobile station which is being called (step 301). If there is one, flow proceeds from step 301 to step 302 to identify the base station controller that is mapped to the called mobile station in the location register 111. A search request message is then sent from the mobile switching center 110 to the identified base station controller. If the called mobile station is within the coverage area of a base station which is connected to more than one base station controller, the mobile switching center identifies such base station controllers and sends a search request message to these base station controllers at the same time.

In FIG. 4, the base station controller responds to the search request message from the mobile switching center by looking up the most recent storage area of the location memory and identifies a base station which is mapped to the called mobile station (step 401). At step 402, the base station controller transmits a paging signal to the identified base station and waits for a response (step 403).

If the called mobile station is within the coverage area of the identified base station, the paging signal will be received by the mobile station and a response is returned to the base station controller via that base station. In this case, the decision at step 403 is affirmative and flow proceeds to step 411 to return an answer message to the mobile switching center and terminates the routine.

Due to the absence of acknowledgment from the base station controller whenever a mobile station crosses the boundary of adjacent cell-site areas, there is a likelihood of a mismatch between the contents of the memory and the cell-site areas actually travelled by a mobile station.

If such a mismatch has occurred, the decision at step 403 is negative and the base station controller recognizes that the paging has failed and proceeds to step 404 to look up the location memory to identify other base stations. At step 405, the base station controller broadcasts a paging signal to the identified other base stations and waits for a response (step 406). If the called mobile station is within one of the coverage areas of these base stations, the paging signal will be received by the mobile station and a response is returned via one of these base stations to the base station controller.

If this is the case, the decision at step 406 is affirmative and flow proceeds to step 411 to return an answer message to the mobile switching center, and terminates the routine.

If no response is returned, flow proceeds from step 406 to step 407 to check to see if all base stations of the base station controller are paged. If so, flow proceeds from step 407 to step 410 to return a failure message to the mobile switching center.

If all base stations have not been paged, flow proceeds from step 407 to step 408 to broadcast a paging signal to the remaining base stations and waits for a response (step 409). If a response is returned, flow proceeds from step 409 to step 411. Otherwise, the base station controller executes step 410 to return a failure message.

A modified method of locating a mobile station is illustrated in FIGS. 5 and 6. In this modification, each base station controller 500 includes a geographic memory 502 as well as a location memory 501, as illustrated in FIG. 5. In the geographic memory 502, data indicating the geographic relations of base stations are stored as a tool which can be used as an aid for evaluating the data stored in the location memory 501 to estimate a base station in which the wanted mobile station is likely to be located.

The operation of the base station controller 500 proceeds as shown in FIG. 6. In response to a search request message from the mobile switching center, the base station controller 500 examines the contents of the entry of location memory 501 which is assigned to the called mobile station and select recently stored data, and base stations corresponding to the selected data are identified (step 601). A paging signal is then broadcast to the identified base stations (step 602) and the base station controller waits for a response (step 603). If a response is received, flow proceeds from step 603 to step 611 to return an answer message to the mobile switching center.

If no response is returned, flow proceeds from step 603 to step 604 to check to see if data stored in the location memory is sufficient to estimate likely base stations. If not, flow proceeds from step 604 to step 608 to broadcast a paging signal to remaining base stations.

If the decision at step 604 is affirmative, flow proceeds to step 605 to read data from geographic memory 502. Base station controller evaluates the data stored in the location memory 501 and determines base stations which are likely to receive a response message from the called mobile station. At step 606, a paging signal is broadcast to the likely base stations to wait for a response (step 607).

If a response is received, flow proceeds from step 607 to step 611. Otherwise, flow proceeds to step 608 to broadcast the paging signal to remaining base stations to wait for a response (step 609). If a response is received, flow proceeds from step 609 to step 611. Otherwise, step 610 is executed to return a failure message to the mobile switching center.

Since no acknowledgment message is returned from the network to a mobile station when it sends a location update message and since the mobile station is not simultaneously paged from all base stations of a location area, the network's downlink traffic can be reduced significantly in comparison with the conventional broadcast paging method.

What is claimed is:

1. A cellular mobile communication network including a plurality of base stations for respectively covering base station areas, the base station areas being assembled into a plurality of location areas and the base station areas of each location area being assembled into a plurality of control groups, the network comprising:

a first database for maintaining a plurality of mobile records, each of the mobile records indicating one of said base station areas when a mobile station crosses a boundary between adjacent location areas and enters said one base station area;

a second database associated with one of said control groups of base station areas for maintaining a plurality of mobile records, one of the mobile records indicating a base station area when said mobile station successively crosses a boundary between adjacent base station areas of one of said location areas;

a first controller responsive to a call request for accessing one of the mobile records in said first database to identify one of said control groups of base station areas and producing a search request; and a second controller associated with one of said control groups of base station areas, the second controller being responsive to said search request for accessing one of said mobile records of said second database and transmitting a paging signal to at least one base station area indicated in the accessed mobile record to wait for a response from said mobile station and broadcasting the paging signal to remaining base station areas of said identified control group if said response is not returned from said mobile station.

2. The cellular mobile communication network of claim 1, wherein said mobile station is arranged to transmit a message indicating that the mobile station is crossing the boundary between adjacent location areas, and wherein said first controller is arranged to respond to the message for creating said one mobile record in said first database and returning an acknowledgment message to said mobile station.

3. The cellular mobile communication network of claim 2, wherein said mobile station is arranged to transmit a message indicating that the mobile station is crossing the boundary between adjacent base station areas, and wherein said second controller is arranged to respond to the message for creating said one mobile record in said second database and returning no acknowledgment message to said mobile station.

4. The cellular mobile communication network of claim 1, wherein said second controller is arranged to:

identify a base station area indicated by most recently stored data in the accessed mobile record;

transmit said paging signal to the identified base station area to determine whether a response is returned from the identified base station area;

if no response is returned, identify other base station areas indicated by data stored in the accessed mobile record;

transmit said paging signal to the identified other base station areas to determine whether a response is returned from one of the identified other base station areas; and if no response is returned, broadcast the paging signal to remaining base station areas of said identified group of base station areas.

5. The cellular mobile communication network of claim 1, further comprising a geographic database for storing geographic data for said identified control group of base station areas, wherein said second controller is arranged to:

select at least one base station area which is recently stored in said one mobile record of said second database;

broadcast said paging signal to the selected at least one base station area and wait for a response;

if no response is returned, evaluate said one mobile record of said second database using said geographic database to determine at least one base station area; and broadcast said paging signal to the determined at least one base station area and wait for a response from said mobile station.

6. The cellular mobile communication network of claim 1, wherein said first controller is provided in a mobile switching center and said second controller is provided in a base station controller.

7. The network of claim 1, wherein said mobile station is not simultaneously paged from more than one base station.

8. The network of claim 1, further comprising a location memory, coupled to said second controller, that stores information on a location of said mobile station.

9. A communication method for a cellular mobile communication network including a plurality of base stations for respectively covering base station areas, the base station areas being assembled into a plurality of location areas and the base station areas of each location area being assembled into a plurality of control groups, the method comprising the steps of:

a) maintaining a plurality of mobile records in a first database (111), each of the mobile records indicating one of said base station areas when a mobile station crosses a boundary between adjacent location areas and enters said one base station area;

b) maintaining a plurality of mobile records in a second database associated with one of said control groups of base station areas, one of the mobile records indicating a base station area when said mobile station successively crosses a boundary between adjacent base station areas of one of said location areas;

c) accessing one of the mobile records in said first database in response to a call request and identifying one of said control groups of base station areas and producing a search request;

d) accessing one of said mobile records of said second database in response to said search request;

e) broadcasting a paging signal to at least one base station area indicated in the accessed mobile record to wait for a response from said mobile station; and f) broadcasting the paging signal to remaining base station areas of said identified control group if said response is not returned from said mobile station.

10. The method of claim 9, wherein said mobile station is arranged to transmit a message indicating that the mobile station is crossing the boundary between adjacent location areas, and wherein the step (a) comprises the steps of:

responsive to the message from the mobile station, creating said one mobile record in said first database; and returning an acknowledgment message to said mobile station.

11. The method of claim 10, wherein said mobile station is arranged to transmit a message indicating that the mobile station is crossing the boundary between adjacent base station areas, and wherein the step (b) comprises the steps of:

responsive to the message from the mobile station, creating said one mobile record in said second database and returning no acknowledgment message to said mobile station.

12. The method of claim 9, wherein the step (e) comprises the steps of:

identifying a base station area indicated by most recently stored data in the accessed mobile record;

transmitting said paging signal to the identified base station area to determine whether a response is returned from the identified base station area;

if no response is returned, identifying other base station areas indicated by data stored in the accessed mobile record;

transmitting said paging signal to the identified other base station areas to determine whether a response is returned from one of the identified other base station areas; and if no response is returned, broadcasting the paging signal to remaining base station areas of said identified group of base station areas.

13. The method of claim 9, further comprising a geographic database for storing geographic data for said identified control group of base station areas, wherein the step (e) comprises the steps of:

selecting at least one base station area which is recently stored in said one mobile record of said second database;

broadcasting said paging signal to the selected at least one base station area and waiting for a response from said mobile station;

if said response is not returned from said mobile station, evaluating said one mobile record of said second database using said geographic database to determine at least one base station area; and broadcasting said paging signal to the determined at least one base station area and waiting for a response from said mobile station.

14. The method of claim 9, wherein simultaneous paging between said mobile station and more than one base station does not occur.

15. The method of claim 9, further comprising storing location information of said mobile station in a location memory that is coupled to said second controller.

16. A cellular mobile communication network, comprising:

a plurality of base stations that cover respective base station areas, said base station areas being assembled into a plurality of location areas, wherein said base station areas of each location area are assembled into a plurality of control groups;

a first database that maintains a plurality of mobile records indicative of one of said base station areas, when a mobile station crosses a boundary between adjacent location areas and enters said one base station area;

a second database that is associated with only one of said control groups of base station areas to maintain a plurality of mobile records, one of said mobile records being indicative of a base station area when said mobile station successively crosses a boundary between adjacent base station areas of one of said location areas;

a first controller configured to respond to a call request and access one of said mobile records in said first database to identify one of said control groups of base station areas and produce a search request;

a second controller associated with only one of said control groups of base station areas, the second controller being responsive to said search request to access one of said mobile records of said second database, and to transmit a paging signal to at least one base station area indicated in said access mobile record to wait for a response from said mobile station and to broadcast said paging signal to remaining base station areas of said identified control group if said response is not returned from said mobile station; and a geographic database that stores geographic data for said identified control group of base station areas.

17. The network of claim 16, wherein said second controller is configured to select at least one base station area that is recently stored in said one mobile record of said second database, broadcast said paging signal to said selected at least one base station area and await a response, evaluate said one mobile record of said second database using said geographic database to determine at least one base station area, and broadcast said paging signal to said determined at least one base station are and wait for a response form said mobile station.

18. The network of claim 16, wherein said first controller is provided in a mobile switching center and said second controller is provided in a base station controller.

19. The network of claim 16, wherein said mobile station transmits a message indicative of said mobile station crossing a boundary between adjacent location areas, and said first controller responds to said message to create said one mobile record in said first database and returns an acknowledgement message to said mobile station.

20. The network of claim 19, wherein said mobile station transmits a message indicative of said mobile station crossing a boundary between adjacent base station areas, and wherein said second controller responds to said message to create said one mobile record in said second database and returns no acknowledgement message to said mobile station.

* * * * *